Patented Feb. 24, 1942

2,274,616

UNITED STATES PATENT OFFICE 2,274,616

QUICK-SETTING VINYL COMPOSITIONS

James Wallace Raynolds, Pittsburgh, Pa., assignor to The Raolin Corporation, New York, N. Y., a corporation of West Virginia No Drawing. Application January 19, 1938, Serial No. 185,785

7 Claims. (Cl. 260—86)

This invention or discovery relates to quick-setting vinyl compositions; and more specifically it relates to a quick-curing and setting vinyl varnish adapted for lacquering cans of tin plate, said varnish containing the usual components, and also a per cent or so of tetramethylthiuram monosulfide or like material adapted to cause a quick cure with expulsion of solvent and production of a compact coating at a temperature below that injurious to the solder used in making cans; that is, a temperature below 350° F.; all as more fully hereinafter set forth and as claimed.

Cans of tin plate, that is, tinned iron or steel are largely used for foods and beverages and it is a desideratum to provide a permanently protective, impervious lining imparting no taste or odor to the contents of the can. This is particularly the case with cans used for beer. The best lining material which has been found is one containing a vinyl resin. A coating of vinyl varnish can be applied to tinned iron which is fairly satisfactory. Vinyl varnishes do not adhere well to naked metals and in addition naked iron has some undesirable chemical effects. But the tin does not chemically affect the resin so much as iron and adherence may be, as stated, fairly satisfactory. In service, organic priming coats are generally used under the vinyl varnish.

Vinyl compounds under proper conditions undergo internal changes that in the end produce a clear colorless resin insoluble in most solvents. Such preparations can be made from vinyl chloride or vinyl acetate, but in practice the best resins are made from a mixture of the two. The commercial vinyl varnishes represent a composition in which reaction has been allowed to go forward to a point at which the material is still soluble in ketonic solvents. Commercial vinyl varnish is a clear solution of such a material in methyl ethyl ketone or other ketonic solvent. These varnishes applied to tinned metal wet it very well and dry down to a layer which can be cured by heat; that is, converted into an insoluble, hard film. Under ideal conditions the heat expels all solvent and makes a poreless continuous film adhering well to the metal. It is customary to use a catalyst such as benzoyl peroxide during the initial polymerization of the vinyl compounds.

Unfortunately, the temperature required to give a really good cure is quite high. It may be as high as 360° F. In one method of lining cans, the varnish is applied to the can interior and is set and dried by heating for 45 minutes at about 60° C. Then the coating is cured by baking for 45 minutes at a much higher temperature.

For other purposes than can-lining the best temperature in curing a vinyl composition is regarded as being of the order of 360°–375° F. With all solders used in can-making, the eutectic begins to soften at a temperature somewhat above 350° F. and the optimum curing temperature of 360° F. cannot be used. Curing is always at a lower temperature and the lining is not of the best quality.

I have discovered that by certain additions to these vinyl varnishes I can secure an effective and good cure at a much lower temperature; a temperature within the range of, say, 200° F. to 300° F. And I can secure a much better union between the varnish and the metal; a union which is more of a cohesion than a mere adhesion. The materials which I add I have called petronizing agents because of their remarkable effect in hardening and shrinking a cured layer. The temperature of boiling water is 212° F. and the curing range overlaps this temperature. With a suitable cure accelerant, I can secure a sufficient cure in 45 minutes at 240° F. in 30 minutes at 265° F. or in 20 minutes at 300° F. The particular cure accelerant or petronizer which I regard as best for this purpose is tetramethylthiuram monosulfide. This gives excellent films cohering well with the metal when cured. The color of the film is red-yellow but this is not material. The cured film is substantially insoluble in the usual ketone solvents such as methyl ethyl ketone and it gives up neither taste nor odor to the can contents.

As stated, tetramethyl thiuram monosulfide is the best reagent I have found for my purpose, but other thiuram mono- and di-sulfides are useful. These are all effective in amounts around 1 per cent. Vinyl varnishes, after expulsion of the solvent as far as possible prior to complete curing, are more or less thermoplastic, due partially to the retention of some solvent. This thermoplasticity is quickly eliminated by heating with thiuram sulfides, especially in larger amounts. The action is more rapid in the absence of acidity.

These thiuram sulfides are all substances exercising chemical and physical action on rubber; reacting with the rubber molecule and changing the character of the rubber. Some of them have been used in accelerating the union of rubber with sulfur in vulcanization. Vinyl derivatives, however, do not have a structure similar to that of caoutchouc nor do they unite with sulfur and become vulcanized. All the preparations useful in the present invention, whether they be accelerants for rubber or no, have the common properties of instituting a progressive action on vinyl resin which in the end completely insolubilizes it in its ordinary solvents, and in turn of making the solvents insoluble in the resin; so to speak, the residual solvent in the resin is "kicked out." With a vinyl varnish the addition of a petronizer produces no immediate change beyond, perhaps, a slight darkening; perhaps an optical result of shrinkage, etc. Nor is the film produced after evaporation of the volatile solvent different at first. But in time it becomes harder and denser and is less attackable by solvents. Adhesion to an underlying surface is better. Atmospheric oxygen appears to play no part in these changes. A short heating quickly effects the same actions. Their progress can be evaluated by testing with acetone or another ketone. A simple and convenient test for petronizing agents is to add 1 per cent of the agent to a neutral, stable, vinyl varnish solution. Samples are dried on glass for a number of hours, say 24, and heated for six hours at 110° C. On testing the dried film with acetone it should not swell or dissolve.

The petronizer should be intimately incorporated with the varnish. It may be brought into solution or dispersed by grinding in a mill. If zinc oxide or other solid accelerator of petronization is included, it must be well dispersed and in intimate contact with the rest of the composition.

In practical embodiments of the present invention I take any of the commercial reactive vinyl preparations; using either a commercial vinyl varnish or a similar preparation dissolved and thinned by a ketonic solvent to a consistency suitable for application by spray, brush or dip. Petronizer is added at some stage of operation and the varnish is applied to the can and the can dried. It is a useful expedient to thin the varnish with a little non-solvent hydrocarbon such as toluol. The varnish may be a 20 per cent solution of a commercial resin. It may contain a softener or plasticizer such as dibutoxy ethyl phthalate, dibutyl phthalate, methyl phthalyl ethyl glycollate, etc., in amount equal to about 10 per cent of the resin. The normal softening effect of the plasticizer mostly disappears in petronization.

In a specific embodiment of the present invention using a plasticizer, a solution is prepared containing, by weight, 1000 parts of methyl isobutyl ketone with 60 parts of dibutoxy ethyl phthalate. A clear solution results. To the liquid is added a separately made solution of 10 parts by weight of tetramethyl thiuram monosulfide and 10 parts benzol. This is adding a petronizer. Continuing the stirring, there is added to the liquid 400 parts by weight of a commercial vinyl resin, known as "Vinylite HH." It is a partially polymerized mixture composed of about 85 per cent vinyl chloride and about 15 per cent vinyl acetate. After compounding the varnish in the proportions mentioned, about 500 parts of a non-solvent, such as toluol, may be added to facilitate evaporation in drying. If the varnish is not clear, as sometimes happens because of insoluble particles of vinyl compounds found in the commercial resin, the varnish should be filtered or centrifuged.

In another embodiment, using no plasticizer, about 10 parts by weight of tetramethyl thiuram sulfide are brought into solution in 1000 parts of methyl isobutyl ketone. Continuing the stirring 400 parts by weight of commercial "Vinylite H" are added. A non-solvent such as toluol may be added, and the solution filtered or centrifuged as before.

I have noted that in these commercial composite resins most of the effect of the petronizer is on the vinyl chloride component rather than the vinyl acetate component. Since the solid resin is 85 per cent vinyl chloride, the 10 parts of petronizer indicated in the example are 3 per cent on the vinyl chloride.

The plasticizer used in the first example is not wholly necessary in a can lining but its presence is advantageous.

While I am more particularly interested in the matter of baking varnishes, particularly applicable to such uses as beer cans, the principle of the present invention in using a cure accelerant is applicable also to making vinyl plastics. Again, the plastic can be cured at a lower temperature, with the production of a dense, hard, clear, resistant shaped article, than is the case where the petronizer is omitted.

In certain other and copending applications Serial Nos. 69,414 filed March 17, 1936 and 116,649 filed December 18, 1936, I have described and claimed the use of petronizers in effecting a quick cure of rubber chloride. The results I attain with vinyl varnish are much like those secured with rubber chloride; a quite unexpected result since vinyl resins and rubber chloride are chemically quite different.

What I claim is:

1. As a new composition of matter, a plastic vinyl chloride resin composition containing about 1 to 3 per cent, on the resin, of a thiuram sulfide adapted to accelerate curing at temperatures below 350° F.

2. The composition of claim 1, wherein the thiuram sulfide is tetramethyl thiuram monosulfide.

3. The composition of claim 1 in the form of a quick-setting varnish containing solvent.

4. A quick-setting vinyl varnish containing a copolymer of vinyl chloride and vinyl acetate, solvent, and a minor amount of a thiuram sulfide adapted to catalyze cure of the vinyl resin and complete elimination of the solvent on heating to temperatures below 350° F.

5. The varnish of claim 4 containing a non-solvent liquid in addition to the solvent liquid.

6. The varnish of claim 4 containing a plasticizer.

7. The varnish of claim 4, wherein the thiuram sulfide is tetramethyl thiuram monosulfide.

JAMES WALLACE RAYNOLDS.